(12) United States Patent
Radzevich

(10) Patent No.: US 8,070,640 B2
(45) Date of Patent: Dec. 6, 2011

(54) FLUCTUATING GEAR RATIO LIMITED SLIP DIFFERENTIAL

(75) Inventor: Stephen P. Radzevich, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 517 days.

(21) Appl. No.: 12/403,141

(22) Filed: Mar. 12, 2009

(65) Prior Publication Data

US 2010/0234163 A1    Sep. 16, 2010

(51) Int. Cl.
*F16H 48/06* (2006.01)
*F16H 48/20* (2006.01)
*F16H 57/08* (2006.01)
*F16H 55/17* (2006.01)

(52) U.S. Cl. ........ 475/230; 475/331; 475/336; 475/344; 74/457; 74/459.5

(58) Field of Classification Search .......... 475/230, 475/236, 331, 336, 344; 74/457–466
See application file for complete search history.

(56) References Cited

U.S. PATENT DOCUMENTS

| | | | | |
|---|---|---|---|---|
| 2,308,558 A | * | 1/1943 | Wildhaber | 74/462 |
| 2,422,326 A | * | 6/1947 | Wildhaber | 74/462 |
| 2,918,831 A | * | 12/1959 | Wildhaber | 475/234 |
| 3,524,361 A | * | 8/1970 | Iyoi Hitosi et al. | 74/417 |
| 3,631,736 A | | 1/1972 | Saari | |
| 3,918,314 A | * | 11/1975 | Osipyan | 74/459.5 |
| 4,222,243 A | * | 9/1980 | Mobsby | 60/742 |
| 6,840,884 B2 | | 1/2005 | Wang et al. | |
| 2002/0134184 A1 | * | 9/2002 | Hawkins | 74/457 |

FOREIGN PATENT DOCUMENTS

EP    1445511 A1    8/2004

OTHER PUBLICATIONS

European Patent Office, International Searching Authority, International Search Report and Written Opinion from counterpart PCT/US2010/026800, mailed Jun. 18, 2010.

* cited by examiner

*Primary Examiner* — Tisha Lewis
(74) *Attorney, Agent, or Firm* — Dykema Gossett PLLC

(57) ABSTRACT

A fluctuating gear ratio limited slip differential assembly is provided that includes a differential case and a pair of side gears disposed within the differential case. Each of the side gears may have a tooth with a first tooth flank. The differential assembly may further include a pinion shaft disposed within the differential case and a plurality of pinions supported by the pinion shaft. The pinions may be configured for engagement with the pair of side gears and each of the pinions may have a tooth with a second tooth flank. The first and second tooth flanks are configured to cause movement of the plane of action defining all contact points between the first tooth flank of the side gears and the second tooth flank of the pinions in a predetermined and/or controlled manner.

25 Claims, 2 Drawing Sheets

FLUCTUATING GEAR RATIO LIMITED SLIP DIFFERENTIAL

TECHNICAL FIELD

The present invention relates to a gear set, including a gear set with each gear of the gear set having a tooth flank that is configured to cause movement of the plane of action defining contact points between the tooth flank of a first gear of the gear set and the tooth flank of a second gear of the gear set in a predetermined and/or controlled manner.

BACKGROUND

As set forth in U.S. Pat. No. 3,631,736, the tooth profiles of gears operating on parallel axes (e.g., cylindrical gears) generally require that the common normal at all points of contact pass through a fixed point on the line of centers, called a pitch point. This is generally a kinematic requirement if one profile is to drive the other at a constant angular speed ratio. A pair of gear profiles contact each other at different positions as the gears rotate. The locus of all possible contact points for a given pair of profiles is called the path of contact. This path of contact is a straight or curved line segment, terminated by the extremities of the gear teeth. The three curves involved in cylindrical gear design are: the profile of the first gear, the profile of the second gear, and the path of contact. Given a fixed center distance and speed ratio, one of these curves may determine the other two. In particular, if the path of contact is shown as a given curve, then the profiles of both gears may be uniquely determined.

For cylindrical gear applications, the gear set may include a first gear with a first profile, a first center point, and a first outside radius (from the first center point to the perimeter of the first gear) and a second gear with a second profile, a second center point, and a second outside radius (from the second center point to the perimeter of the second gear). Pitch radii are the distances between the pitch point and the respective gear centers (i.e., the first center point and the second center point). In other words, the pitch radii specify the distance between the pitch point and the respective gear axis. As the first and second gears rotate, the profile curves of the first and second gears will contact each other at different positions and the locus of all successive contact points determine the shape of the path of contact (e.g., line of action).

Each contact point may be indicated in terms of polar coordinates as being located at a certain distance from the pitch point and at a certain angle which is also the pressure angle from a horizontal line normal to the line connecting the first and second center points. The first and second profiles for the gears may have first and second radii of curvature, respectively, with first and second lengths.

It may be desirable to use tooth flank geometry of a first and second gear (e.g., a pinion gear and a side gear in a differential) to cause movement of a plane of action defining contact points between the tooth flank of a first gear and the tooth flank of a second gear in a predetermined and/or controlled manner.

SUMMARY

A gear set is provided that may include a first gear with a first tooth flank and a second gear with a second tooth flank. The first tooth flank and the second tooth flank may be configured to case movement of the plane of action defining contact points between the first tooth flank and the second tooth flank in a predetermined and/or controlled manner.

A fluctuating gear ratio limited slip differential assembly is provided that may include a differential case and a pair of side gears disposed within the differential case. Each of the side gears may have a tooth with a first tooth flank. The differential assembly may further include a pinion shaft disposed within the differential case and a plurality of pinions supported by the pinion shaft. The pinions may be configured for engagement with the pair of side gears and each of the pinions may have a tooth with a second tooth flank. The first and second tooth flanks are configured to cause movement of the plane of action defining contact points between the first tooth flank of the side gears and the second tooth flank of the pinions in a predetermined and/or controlled manner.

A method for designing a gear set is provided that may include the steps of determining a desired torque bias and a desired portion of torque to be transferred to a first gear and determining a predetermined movement of a plane of action that will result in the desired torque bias and a desired portion of torque being transferred to the first gear. The method may further include the steps of determining contact points between the first gear and a second gear defined by the plane of action and determining the tooth flank of the first and second gears that correspond to the contact points defined by the plane of action.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
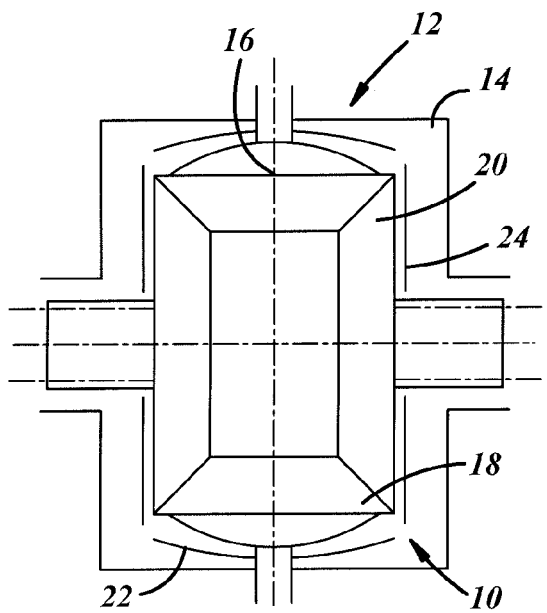
FIG. 1 is a schematic section view of a differential in accordance with an embodiment of the invention.

FIG. 1 illustrates a schematic section view of a gear set 10 in accordance with an embodiment of the present invention. As illustrated in FIG. 1, the gear set 10 may be utilized in a differential 12. For example and without limitation, the differential 12 may comprise a limited-slip differential. The inventive gear set 10 may be used to provide for unequal distribution of torque on two side gears of a limited-slip differential 12 for wheeled vehicles. The limited-slip differential 12 may comprise a fluctuating gear-ratio limited slip differential in some embodiments.

In particular, the function of a fluctuating gear-ratio limited slip differential may be realized by periodic changes (e.g., fluctuations) in gear ratio between the pinions and side gears during engagement between the pinions and side gears, coupled with the pinions having an odd number of the gear ratio fluctuating period in one revolution so that when the gear ratio between the pinions and one side gear reaches the maximum, the gear ratio between the pinions and the other side gear gets the minimum, thus creating an unequal distribution of torque on two side gears.

Still referring to FIG. 1, the differential 12 may include a differential case 14 and a pinion shaft 16. The differential case 14 may be driven by an input shaft (not shown). The pinion shaft 16 may comprise either a cross or straight shaft and may be fixed inside the differential case 14. The differential 12 may further include a pinion gear 18 and a side gear 20. The pinion gear 18 may be supported by the pinion shaft 16 and may be configured for engagement with the side gear 20. The pinion gear 18 and the side gear 20 may each comprise a plurality (e.g., pair) of gears. Spherical thrust washers 22 may be disposed between the back sides of the pinion gears 18 and the differential case 14. Flat thrust washers 24 may be disposed between the back sides of the side gears 20 and the differential case 14. The differential 12 may be adapted to allow different rotational speeds between side gears 20 disposed within differential case 14.

The gear set 10 of the present invention may include first and second gears. The first gear may comprise pinion gear 18 and the second gear may comprise side gear 20 in accordance with an embodiment of the invention. Although the gear set 10 is described as having first and second gears comprising a pinion gear 18 and side gear 20, the first and second gears making up gear set 10 may comprise any number of different gears and remain within the spirit and scope of the invention. The first gear may include a tooth having a first tooth flank, and the second gear may have a tooth having a second tooth flank.

The geometry of the tooth flanks of the first and second gears (for example only and without limitation, pinion gear 18 and side gear 20) of the invention may be configured to cause movement of the plane of action in a predetermined manner. In other words, the movement of the plane of action may be a controlled and/or optimized movement. The plane of action may also be referred to as a surface of action. The plane of action defines contact points between a first tooth flank of the first gear of the gear set and a second tooth flank of the second gear of the gear set. The tooth flank of the first gear is represented by consecutive positions of the plane of action that is moving with respect to a coordinate system associated with the first gear. The tooth flank of the second gear is represented by consecutive positions of the plane of action that is moving with respect to a coordinate system associated with the second gear.

Figure 2:
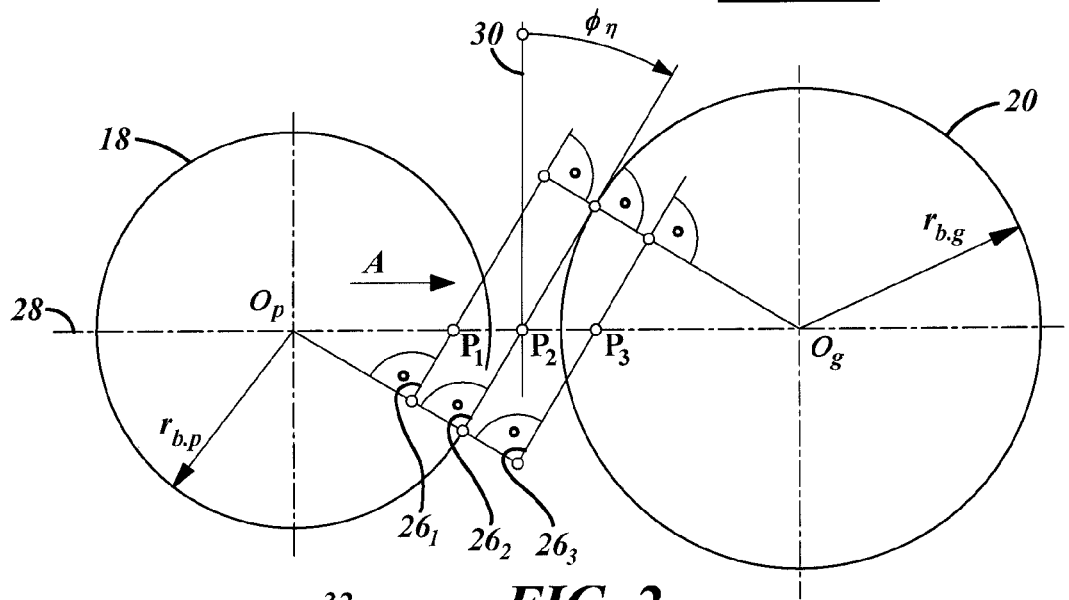
FIG. 2 is a schematic of the line of action between a first gear and a second gear in accordance with an embodiment of the invention.

Referring now to FIG. 2, a schematic of a line of action 26₁, 26₂, or 26₃ between a first gear (e.g., pinion gear 18) and a second gear (e.g., side gear 20) is illustrated as background to understand the plane of action. Gears 18 and 20 may make contact along the line of action 26₁, 26₂, and 26₃. As illustrated, the line of action 26₁, 26₂, or 26₃ is not stationary, but moves in a predetermined and/or controlled and/or optimized manner. For example, in accordance with the predetermined and/or controlled and/or optimized manner of movement of the line of action, the line of action may be configured to move from a first position (e.g., the position of line 26₁, 26₂) to a second position (e.g., the position of 26₂, or 26₃). The orientation of the line of action in the first position may be substantially parallel to the orientation of the line of action in the second position. The movement of the line of action allows the gear set to transfer more torque to one of a pair of tires (e.g., controlled by side gear 20). The amount of torque to be transferred to a pair of tires (e.g., a right-side tire and a left-side tire) will depend on the surfaces on which the tires are operating and/or the amount of traction between the tires and the surfaces. The pinion 18 may have a center point $O_p$, and the side gear 20 may have a center point $O_g$. A central line 28 runs between the center points $O_p$ and $O_g$. The pitch point $P_1$, $P_2$, or $P_3$ is the intersection of the central line 28 and the line of action 26. The radii of the base cylinders of the pinion 18 and side gear 20, respectively, $r_{b,p}$, $r_{b,g}$, extend from the center points $O_p$ and $O_g$, respectively to the line of action 26₁, 26₂, or 26₃. A line 30 runs perpendicular to the central line 28 through the pitch point $P_1$, $P_2$, or $P_3$. The profile angle $\phi_n$ is the angle between the line 30 and the line of action 26₁, 26₂, or 26₃. FIG. 2 may be useful to visualize a plane of action that is moving in a controlled and/or optimized manner for a pinion 18 and side gear 20, since the line of action 26₁, 26₂, or 26₃ is used for two-dimensional geometry, and a plane of action is used for three-dimensional geometry.

The torque ratio between the left and right side tires may be based on the surfaces on which the tires are operating and/or the amount of traction between the tires and the surfaces. For a known and/or desired torque ratio, the desired and/or optimal and/or controlled movement of the plane of action in a predetermined manner may be determined. For a predetermined manner of movement of the plane of action, the trajectory of the points of contact may be determined. For a known trajectory of the points of contact, the geometry of the tooth flanks may be determined. In accordance with an embodiment of the present invention, the plane of action that is moving in a controlled and/or optimized manner may be based on and/or correspond to rotation of the pinion gear 18. For example, and without limitation, the plane of action may be moving with a constant speed that is timed with constant rotation of the pinion gear 18 in an embodiment. For another example, and without limitation, in accordance with the predetermined and/or controlled manner of movement of the plane of action, the plane of action may be configured to move from a first position to a second position. The orientation of the plane of action in the first position may be substantially parallel to the orientation of the plane of action in the second position. The movement of the plane of action may be configured to transfer gradually increasing torque to the side gear 20 (i.e., the second gear of the gear set 10). The movement of the plane of action may also be configured to transfer gradually decreasing torque to the side gear 20 (i.e., the second gear of the gear set 10) in other instances. In this way, the predetermined and/or controlled movement of the plane of action may be configured to transfer a first amount of torque to a first side gear 20 (e.g., on a right side of a vehicle) and a second amount of torque to a second side gear 20 (e.g., on a left side of a vehicle), wherein the first and second amounts of torque are different. Accordingly, each of a pair of side gears 20 may be configured to rate at different rotational speeds.

In other embodiments, the plane of action may be moving in a different predetermined and/or controlled manner. For example, the plane of action may undergo acceleration or deceleration depending upon the engagement of the tooth flank of the first gear (e.g., pinion gear 18) and the tooth flank of the second gear (e.g., side gear 20). The plane of action may undergo acceleration or deceleration from the pitch point towards the axis of the gear (e.g., pinion gear 18 or side gear 20), rather than moving at a constant speed. In this way, the movement of the plane of action may be based on engagement of the short teeth (e.g., working teeth) on the first and second gears (e.g., pinion gear 18 and side gear 20).

The teeth on the gears (e.g., pinion gear 18 and side gear 20) may serve different purposes. For example, a tall tooth on the pinion gear 18 and/or side gear 20 may help with reengagement for the low teeth on the gears 18, 20. The low teeth are the working and/or active teeth (i.e., teeth that transmit torque). The low teeth are configured to transfer torque from the first gear (e.g., pinion gear 18) to the second gear (e.g., side gear 20) when engaged. On the other hand, the tall teeth may not transmit torque. The tall teeth are configured to be higher than the low teeth and may have a smaller angle for their tooth flank in order to provide re-engagement of the working teeth on the first and second gears. Because of the tall teeth and short teeth on the gears (e.g., pinion gear 18 and side gear 20) of a gear set 10, there may not be a smooth transmission of torque, thereby resulting in noise and shock that needs to be absorbed. Noise reduction may be a strong consideration in motor vehicle design. The modified tooth flank geometry of the present invention may be configured to help eliminate the pinion and side gear tall tooth vulnerability to the shock while engaging, thereby reducing noise excitation.

A single group of teeth may include one tall tooth (i.e., a tooth configured to assist with reengagement between gears) and one or more short teeth (i.e., working and/or active teeth that transmit torque). There is an odd number of teeth in each group of teeth. For example, there may be three teeth in each group. Although three teeth are mentioned in detail, the number of teeth may be greater in other embodiments of the invention, although the number of teeth must still be an odd number (e.g., five teeth, seven teeth, nine teeth, etc.). Even though more torque bias can be achieved with a larger tooth number, an embodiment involves three teeth in each group since a larger tooth number requires more room for the gear set 10, and the dimensions of a differential housing (e.g., differential case 14) are limited. Under a rotation cop of a gear (e.g., pinion gear 18) having $N_{gr}$ groups of teeth, a period of gear ratio fluctuation is equal to $\omega_p/N_{gr}$. The number of teeth in each period correspond to the number of pitches involved in each period. The movement of the plane of action is only in connection with the working and/or active teeth (i.e., the short teeth) of a single group, and is not in connection with the tall teeth.

As the first and second gears (e.g., pinion gear 18 and side gear 20) of the gear set 10 rotate, the low teeth may be disengaged from contact with one another, the tall tooth of the first gear (e.g., pinion 18) may engage in contact with the teeth of the second gear (e.g., side gear 20) to help the next pair of the teeth of the first and second gears get into mesh, and then the next pair of working teeth may be engaged. At the step where the tall tooth of the first gear is in contact with the teeth of the second gear or where a tall tooth of the second gear is in contact with the teeth of the first gear, the tall tooth may be subjected to shock that may result in tall tooth failure. To eliminate and/or significantly reduce the vulnerability of tall tooth to shock, the following movement of the plane of action may be beneficial. First, at or slightly before the short teeth disengagement, the instant plane of action starts to slow down speed of its motion in the direction of A (FIG. 2) from a certain value to zero value at the instant that corresponds to the beginning of meshing of the second pair of the short teeth. Further, acceleration of the motion of the instant plane of action in the direction of A (FIG. 2) may be equal to zero at the beginning and end of engagement of the tall tooth, and may reach a certain constant value in between. One approximation for the movement of the plane of action is that the instant plane of action may get motionless at the end point of engagement of the short teeth (i.e., working teeth) of the pinion gear 18 and the side gear 20. The desired and/or controlled and/or predetermined movement of the instant plane of action may be achieved due to corresponding changes in the tooth flank for the first and second gears (e.g., pinion gear 18 and side gear 20). In accordance with the invention, the tooth flank for the first and second gears (e.g., pinion gear 18 and side gear 20) may be designed in order to provide a desired acceleration and/or deceleration of the plane of action.

As described in the background, cylindrical gearing may use pitch radii and the lengths of the radii of curvature to determine the geometry and/or profile of the tooth flanks of the gears making up a gear set. In contrast, bevel gears may use pitch cones to determine the geometry of the tooth flanks of the bevel gears making up a gear set, instead of pitch radii and the lengths of the radii of curvature. The geometry of the tooth flanks of the first and second gears (e.g., pinion gear 18 and side gear 20) of the invention may be expressed in terms of spiral cone pitch surfaces. The portion of a tooth that is located outward to the spiral cone pitch surface may be referred to as an addendum. Similarly, the portion of a tooth that is located between the spiral cone pitch surface and the fillet cone surface may be referred to as a dedendum. In order to derive the equations for the modified tooth flank of the gears of the present invention, the derivation of an equation for tooth flank of an ordinary (e.g., prior art) bevel gear may be used.

Figure 4:
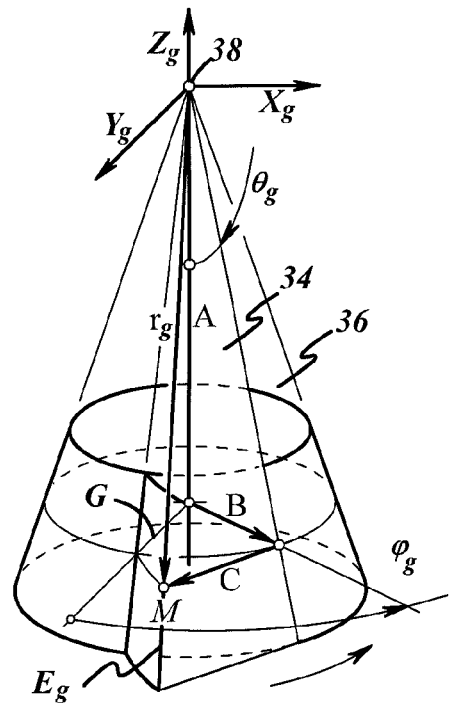
FIG. 4 is a schematic of a gear base cone for the bevel gear of FIG. 3.
Figure 3:
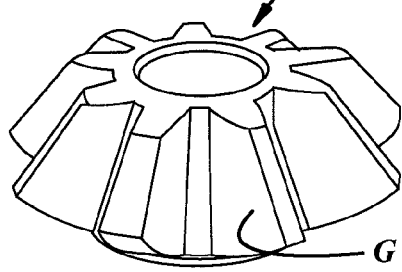
FIG. 3 is a perspective view of a prior art bevel gear having a gear tooth flank.

Referring to FIG. 3, a perspective view of a prior art bevel gear 32 having a gear tooth flank G is illustrated. Generation of the gear tooth flank G of an ordinary bevel gear 10 may be interpreted as rolling, with no sliding of a plane 34 over the gear base cone 36 illustrated in FIG. 4. Accordingly, the surface of the gear tooth flank G may be represented as the loci of a straight line $E_g$ through the apex 38 and within the tangent plane 34. Once the plane surface 34 is rolling over the gear base cone 36, then it is tangent to the gear base cone 36.

A position vector $r_g$ specifies the $X_g, Y_g, Z_g$ coordinates of points of the tooth flank. The position vector $r_g$ of a point M of the tooth flank G can be represented as a summa of three vectors. In particular, the equation for the position vector $r_g$ is as follows:

$r_g = A + B + C$, where the vectors A, B, and C are equal to the following $$A = -k \cdot U_g \quad \text{(Equation 1)}$$

$$B = i \cdot U_g \tan \theta_g \sin \phi_g + j \cdot U_g \tan \theta_g \cos \phi_g \quad \text{(Equation 2)}$$

$$C = -i \cdot \phi_g U_g \tan \theta_g \cos \phi_g + j \cdot \phi_g U_g \tan \theta_g \sin \phi_g \quad \text{(Equation 3)},$$

wherein i, j, and k denote unit vectors along axes $X_g, Y_g, Z_g$ (i.e., the element "i" is a vector of length 1 that is pointed along the axis "$X_g$"; the element "j" is a vector of length 1 that is pointed along the axis "$Y_g$", and the element "k" is a vector of length 1 that is pointed along the axis "$Z_g$") and $U_g$ indicates the distance measured from the apex 38 to the projection of M onto the $Z_g$ axis. $U_g$ and $\phi_g$ are the parameters of the tooth flank G.

By substituting the vectors A, B, and C into the equation $r_g = A + B + C$, the equation for the tooth flank G for a pinion gear 18 (Equation 4) may be derived in matrix representation:

$$r_p = \begin{bmatrix} U_p\tan\theta_p\sin\varphi_p - \varphi_p \cdot U_p \cdot \tan\theta_p\cos\varphi_p \\ U_p\tan\theta_p\cos\varphi_p + \varphi_p \cdot U_p \cdot \tan\theta_p\sin\varphi_p \\ -U_p \\ 1 \end{bmatrix} \quad \text{(Equation 4)}$$

Equations of the same structure may be used for bevel gears, and a pinion and a side gear. However, the equations are not identical. For example, the equations may have different coefficients (e.g., "$\theta_p$" for the pinion and "$\theta_{sg}$" for the side-gear). The equation for the tooth flank G for a side gear 20 (Equation 4.1) may be derived in matrix representation:

$$r_{sg} = \begin{bmatrix} U_{sg}\tan\theta_{sg}\sin\varphi_{sg} - \varphi_{sg} \cdot U_{sg} \cdot \tan\theta_{sg}\cos\varphi_{sg} \\ U_{sg}\tan\theta_{sg}\cos\varphi_{sg} + \varphi_{sg} \cdot U_{sg} \cdot \tan\theta_{sg}\sin\varphi_{sg} \\ -U_{sg} \\ 1 \end{bmatrix} \quad \text{(Equation 4.1)}$$

For the differential applications, the equality $\theta_p + \theta_{sg} = 90°$ is usually observed. Accordingly, pitch angle $\theta_{sg}$ can be expressed in terms of the pitch angle of the pinion $\theta_p$ as $\theta_{sg} = 90° - \theta_p$. In this way, the number of unknowns reduces by one unknown (i.e., not two parameters $\theta_p + \theta_{sg}$, but only parameter $\theta_p$ remains unknown). After being substituted into Equation 4.1, this equation for the expression for the tooth flank of the side gear (Equation 4.2) may be represented in matrix formation:

$$r_{sg} = \begin{bmatrix} U_{sg}\cot\theta_p\sin\varphi_{sg} - \varphi_{sg} \cdot U_{sg} \cdot \cot\theta_p\cos\varphi_{sg} \\ U_{sg}\cot\theta_p\cos\varphi_{sg} + \varphi_{sg} \cdot U_{sg} \cdot \cot\theta_p\sin\varphi_{sg} \\ -U_{sg} \\ 1 \end{bmatrix} \quad \text{(Equation 4.2)}$$

Further reduction of the total number of unknowns could be based on the following equality $\phi_{sg} = u \cdot \phi_p$, where u designates the tooth ratio of the pinion to side gear mesh.

$$r_{sg} = \begin{bmatrix} U_{sg}\cot\theta_p\sin(u \cdot \varphi_p) - (u \cdot \varphi_p) \cdot U_{sg} \cdot \cot\theta_p\cos(u \cdot \varphi_p) \\ U_{sg}\cot\theta_p\cos(u \cdot \varphi_p) + (u \cdot \varphi_p) \cdot U_{sg} \cdot \cot\theta_p\sin(u \cdot \varphi_p) \\ -U_{sg} \\ 1 \end{bmatrix} \quad \text{(Equation 4.3)}$$

Figure 5:
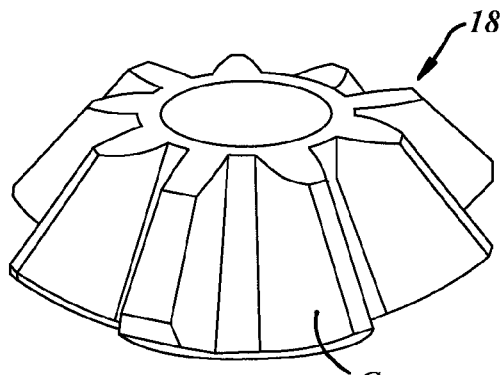
FIG. 5 is a perspective view of a pinion having a modified gear tooth flank in accordance with an embodiment of the invention.
Figure 6:
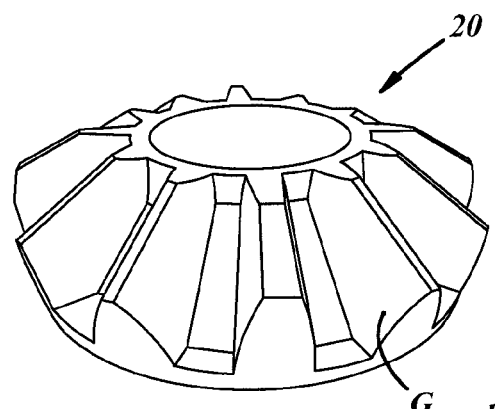
FIG. 6 is a perspective view of a side gear having a modified gear tooth flank in accordance with an embodiment of the invention.

Referring now to FIG. 5, the geometry of a modified gear tooth flank $G_{mod}$ for a pinion gear 18 is illustrated. Referring now to FIG. 6, the geometry of a modified gear tooth flank $G_{mod}$ for a side gear 20 is illustrated. The position vector $r_g$ representing the geometry of the modified gear tooth flank $G_{mod}$ is represented by a different equation in matrix representation. The difference in equation in matrix representation for the modified gear tooth flank $G_{mod}$ is due to the travel of the plane of action (i.e., the plane of action defining all contact points between the first tooth flank and the second tooth flank of the gears making up the gear set). The travel of the plane of action is what makes torque biasing possible. The plane of action may travel in a predetermined and/or controlled manner as described herein. The expression for the position vector $r_g^{mod}$ for the inventive bevel gear can be derived from the expression for the position vector $r_g$ for an ordinary (e.g., prior art) bevel gear. The expression for the modified position vector $r_g^{mod}$ may consider the cone angle $\theta_g$ as a function of the angle of rotation $\phi_g$ of the gear, as set forth in the following equation for the modified position vector $r_g^{mod}$:

$$r_p^{mod} = \begin{bmatrix} U_p\tan\theta_p(\varphi_p)\sin\varphi_p - \varphi_p \cdot U_p \cdot \tan\theta_p(\varphi_p)\cos\varphi_p \\ U_p\tan\theta_p(\varphi_p)\cos\varphi_p + \varphi_p \cdot U_p \cdot \tan\theta_p(\varphi_p)\sin\varphi_p \\ -U_p \\ 1 \end{bmatrix} \quad \text{(Equation 5)}$$

Similar to how Equation 4.2 may be derived from Equation 4, Equation 4 for the pinion tooth flank may allow for an equation for the side gear tooth flank (Equation 5.1) set forth in matrix formation:

$$r_{sg}^{mod} = \begin{bmatrix} U_{sg}\cot\theta_p(\varphi_{sg})\sin\varphi_{sg} - \varphi_{sg} \cdot U_p \cdot \cot\theta_p(\varphi_{sg})\cos\varphi_{sg} \\ U_{sg}\cot\theta_p(\varphi_{sg})\cos\varphi_{sg} + \varphi_{sg} \cdot U_p \cdot \cot\theta_p(\varphi_{sg})\sin\varphi_{sg} \\ -U_{sg} \\ 1 \end{bmatrix} \quad \text{(Equation 5.1)}$$

Further reduction of the total number of unknowns can be based on the following equality: $\phi_{sg} = u \cdot \phi_p$, where u designates the tooth ratio of the pinion to side gear mesh.

$$r_{sg}^{mod} = \begin{bmatrix} U_{sg}\cot\theta_p(u \cdot \varphi_p)\sin(u \cdot \varphi_p) - \\ (u \cdot \varphi_p) \cdot U_p \cdot \cot\theta_p(u \cdot \varphi_p)\cos(u \cdot \varphi_p) \\ U_{sg}\cot\theta_p(u \cdot \varphi_p)\cos(u \cdot \varphi_p) + \\ (u \cdot \varphi_p) \cdot U_{sg} \cdot \cot\theta_p(u \cdot \varphi_p)\sin(u \cdot \varphi_p) \\ -U_{sg} \\ 1 \end{bmatrix} \quad \text{(Equation 5.2)}$$

Other approaches may be used for the derivation of the equation for the modified position vector $r_g^{mod}$ representing the geometry of the modified gear tooth flank $G_{mod}$ as will be known to those of ordinary skill in the art. The function $\theta_{sg}$ vs. $\phi_{sg}$ can be a linear function, and can be represented in the form of $\theta_{sg} = a \cdot \phi_{sg}$, where a certain constant is denoted as "a." This constant a can be determined and expressed in terms of the desired torque bias.

The parameter "a" affects the actual shape of the tooth flank of the pinion 18 and of the side gear 20. The limitation for the parameter "a" is twofold. First, neither tooth flank of the pinion 18, nor the side gear 20, may exist below the corresponding base cone. Second, no tooth pointing at the outside cone is permissible. The range for the value of the parameter "a" may be computed based on these limitations. As the side gear rotates, at a certain instant of time a tooth flank of the side gear (e.g., side gear 20) is engaged into mesh with the mating gear (e.g., pinion 18). The contact of the tooth flank of the side gear 20 with the tooth flank of the mating pinion 18 remains while the side gear 20 is rotated through a certain angle (μ: μ is the angle of rotation of the side gear 20 within which a tooth flank of the side gear 20 is in mesh with the tooth flank of the pinion 18). The desired torque bias through the differential (e.g., differential 12) may be designated as $T_{bias}$. In order to achieve the desired torque bias $T_{bias}$ in accordance with the invention, the angle $\theta_{sg}$ (see Equation 4.1) may change from a value $\theta_{sg}^{start}$, when μ=0, to a value $\theta_{sg}^{end}$ when the teeth are disengaged from the mesh. The ratio $\theta_{sg}^{start}/\theta_{sg}^{end}$ is equal to $T_{bias}$, (i.e., the equality $\theta_{sg}^{start}/$ $\theta_{sg}{}^{end} = T_{bias}$ is valid). Ultimately, the desired value of the parameter "a" can be computed from the expression:

$$a = \frac{\theta_{sg}^{end} - \theta_{sg}^{start}}{\mu} \quad \text{(Equation 5.3)}$$

When the cone angle $\theta_g$ is a linear function of the angle of rotation $\phi_g$ of the gear (i.e., $\theta_g = a \cdot \phi_g$), then the equation for the modified position vector $r_g^{mod}$ may be reduced to the following equation:

$$r_g^{mod} = \begin{bmatrix} U_g \tan(a \cdot \varphi_g) \sin\varphi_g - \varphi_g \cdot U_g \cdot \tan(a \cdot \varphi_g) \cos\varphi_g \\ U_g \tan(a \cdot \varphi_g) \cos\varphi_g - \varphi_g \cdot U_g \cdot \tan(a \cdot \varphi_g) \cos\varphi_g \\ -U_g \\ 1 \end{bmatrix} \quad \text{(Equation 6)}$$

Figure 7:
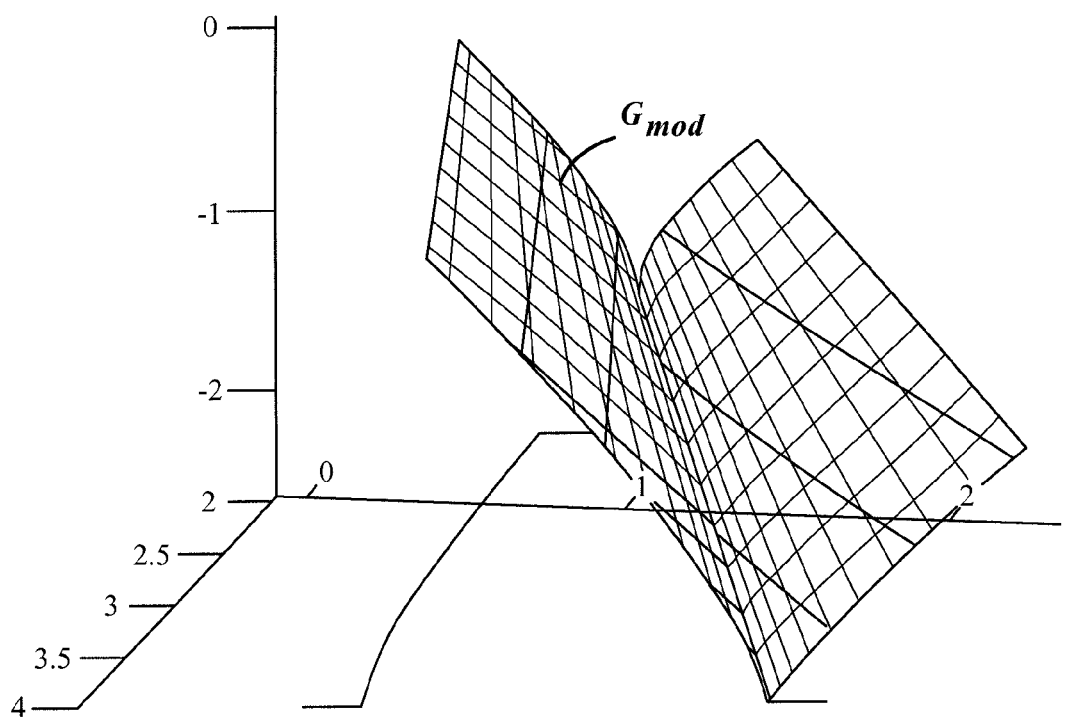
FIG. 7 is an example of computer modeling of a modified gear tooth flank in accordance with an embodiment of the invention.

By having the cone angle $\theta_g$ be a linear function of the angle of rotation $\phi_g$ of the gear, the function $\theta_g = a \cdot \phi_g$ is the simplest possible function. Generally, the cone angle $\theta_g$ as a function of the angle of rotation $\phi_g$ of the gear can be more sophisticated in other embodiments. The function of the cone angle $\theta_g$ as a function of the angle of rotation $\phi_g$ will depend on the torque biasing by the differential that is required and/or desired for certain differential applications. The linear relationship $\theta_g = a \cdot \phi_g$ is a practical function. An example of computer modeling of the modified tooth flank $G_{mod}$ is illustrated in FIG. 7. The geometry of tooth flank of the first and second gears (e.g., pinion gear 18 and side gear 20) may be expressed in terms of design parameters for the first and second gears. Conventional engineering formulae may be used as is known to those of ordinary skill in the art.

A method for designing a gear set 10 in accordance with the present invention is also provided. The method may include the steps of determining a desired torque bias and a desired portion of torque to be transferred to a first gear; determining a predetermined movement of a plane of action that will result in the desired torque bias and a desired portion of torque being transferred to the first gear; determining the contact points between the first gear and a second gear defined by the plane of action; and determining the tooth flank of the first and second gears that correspond to the contact points defined by the plane of action.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed is:

1. A gear set comprising:
a first gear having a first tooth flank;
a second gear having a second tooth flank,
wherein the first tooth flank and second tooth flank are configured to cause linear translation of the plane of action defining contact points between the first tooth flank and the second tooth flank in a controlled manner and provide a select amount of torque to the second gear.

2. A gear set in accordance with claim 1, wherein the linear translation of the plane of action is configured to transfer gradually increasing torque to the second gear.

3. A gear set in accordance with claim 1, wherein the linear translation of the plane of action is configured to transfer gradually decreasing torque to the second gear.

4. A gear set in accordance with claim 1, wherein the first gear comprises a pinion.

5. A gear set in accordance with claim 4, wherein the second gear comprises a first side gear.

6. A gear set in accordance with claim 5, further comprising a third gear, wherein the third gear comprises a second side gear.

7. A gear set in accordance with claim 6, wherein the linear translation of the plane of action is configured to transfer a first amount of torque to the first side gear and a second amount of torque to the second side gear, wherein the first and second amounts of torque are different.

8. A gear set in accordance with claim 1, wherein the linear translation of the plane of action corresponds to the rotation of the first gear.

9. A gear set in accordance with claim 8, wherein the linear translation of the plane of action is at a constant speed.

10. A gear set in accordance with claim 8, wherein the linear translation of the plane of action includes acceleration or deceleration depending upon the engagement of the first and second tooth flanks.

11. A gear set in accordance with claim 1, wherein the first and second gears each have at least one working tooth configured to transfer torque from the first gear to the second gear when engaged.

12. A gear set in accordance with claim 11, wherein the first and second gears each have at least one higher tooth that is higher than the working tooth, wherein the higher tooth is configured to help with engagement of the working tooth on the first and second gears.

13. A gear set in accordance with claim 12, wherein the linear translation of the plane of action is based on engagement of the working tooth on the first gear and the working tooth on the second gear.

14. A gear set in accordance with claim 1, wherein the first and second tooth flanks are derived from pitch cones.

15. A gear set in accordance with claim 1, wherein the first gear has a first coordinate system and the second gear has a second coordinate system, wherein the plane of action is configured to translate with respect to the first coordinate system and with respect to the second coordinate system.

16. A gear set in accordance with claim 1, wherein the plane of action is configured to translate from a first position to a second position, and the orientation of the plane of action in the first position is substantially parallel to the orientation of the plane of action in the second position.

17. A fluctuating gear ratio limited slip differential assembly comprising:
a differential case;
a pair of side gears disposed within the differential case, each of said side gears having a tooth having a first tooth flank;

a pinion shaft disposed within the differential case;

a plurality of pinions supported by said pinion shaft and configured for engagement with the pair of side gears, each of said pinions having tooth having a second tooth flank;

wherein the first and second tooth flanks are configured to cause linear translation of the plane of action defining contact points between the first and second tooth flanks in a controlled manner and provide a select amount of torque to each of said side gears.

18. A differential assembly in accordance with claim 17, wherein the linear translation of the plane of action is configured to transfer a first amount of torque to one of the pair of side gear and a second amount of torque to the other of the pair of side gears, wherein the first and second amounts of torque are different.

19. A differential assembly in accordance with claim 17, wherein the linear translation of the plane of action corresponds to the rotation of the plurality of pinions.

20. A differential assembly in accordance with claim 17, wherein the linear translation of the plane of action is at a constant speed.

21. A differential assembly in accordance with claim 17, wherein the linear translation of the plane of action includes acceleration or deceleration depending upon the engagement of the pair of side gears and plurality of pinions.

22. A differential assembly in accordance with claim 17, further comprising an input shaft configured to drive the differential case.

23. A differential assembly in accordance with claim 17, wherein a gear ratio between the pinion and the pair of side gears fluctuates during engagement between the pinions and the pair of side gears.

24. A differential assembly in accordance with claim 17, wherein each of the pair of side gears is configured to rotate at a different rotational speed.

25. A method for designing a gear set comprising:
   determining a desired torque bias and a desired portion of torque to be transferred to a first gear;
   determining a predetermined translation of a plane of action that will result in the desired torque bias and a desired portion of torque being transferred to the first gear;
   determining contact points between the first gear and a second gear defined by the plane of action; and
   determining the tooth flank of the first and second gears that correspond to the contact points defined by the plane of action.

* * * * *